United States Patent
Cunningham et al.

(10) Patent No.: US 7,343,775 B2
(45) Date of Patent: Mar. 18, 2008

(54) DEVICE FOR CONTINUOUS CALIBRATION OF A GAS MASS FLOW MEASUREMENT DEVICE

(75) Inventors: Timothy J. Cunningham, Boulder, CO (US); Andrew Timothy Patten, Boulder, CO (US); Charles L. Gray, Boulder, CO (US); Dean M. Standiford, Loveland, CO (US)

(73) Assignee: Micro Motion, Inc., Boulder, CO (US)

( * ) Notice: Subject to any disclaimer, the term of this patent is extended or adjusted under 35 U.S.C. 154(b) by 145 days.

(21) Appl. No.: 10/557,077

(22) PCT Filed: Jun. 11, 2003

(86) PCT No.: PCT/US03/18513

§ 371 (c)(1), (2), (4) Date: Nov. 17, 2005

(87) PCT Pub. No.: WO2005/005938

PCT Pub. Date: Jan. 20, 2005

(65) Prior Publication Data

US 2007/0043976 A1 Feb. 22, 2007

(51) Int. Cl.
*G01N 37/00* (2006.01)
*G01F 25/00* (2006.01)

(52) U.S. Cl. ........................ 73/1.06; 73/1.35
(58) Field of Classification Search ............ 73/1.06, 73/1.27, 1.28, 1.16, 1.35; 702/100
See application file for complete search history.

(56) References Cited

U.S. PATENT DOCUMENTS 2,987,911 A * 6/1961 McDonell .................. 73/1.32
4,658,634 A * 4/1987 Killough et al. ............ 73/1.28

(Continued)

FOREIGN PATENT DOCUMENTS

CN   1351709 A   5/2002

(Continued)

OTHER PUBLICATIONS

Isabelle Care, Development of a New Calibration Wind Tunnel Within Low Air Velocity Range 0.05 up to 2 m.s, Flomeko Conference 2003, May 11, 2003, Groningen, Paper presented during conference and included in proceedings.

(Continued)

*Primary Examiner*—Hezron Williams
*Assistant Examiner*—Tamiko Bellamy
(74) *Attorney, Agent, or Firm*—The Ollila Law Group LLC

(57) ABSTRACT

A gas test system (300) is disclosed comprised of a flow loop (302), a blower system (304), a temperature control system (306), a reference meter system (308), and a unit under test (UUT) system (310). The UUT system connects a unit under test (UUT) to the flow loop. The blower system receives the gas under pressure at an inlet (321), and generates a high flow rate of the gas out of an outlet (322) while generating a low pressure rise from the inlet to the outlet. The temperature control system receives the flow of gas from the blower system and controls the temperature of the gas. The reference meter system and the UUT in the UUT system measure a property of the gas circulating through the flow loop. The measurements of the reference meter system can be compared to the measurements of the UUT to calibrate the UUT.

24 Claims, 5 Drawing Sheets

U.S. PATENT DOCUMENTS

| | | | |
|---|---|---|---|
| 5,072,416 A | * | 12/1991 | Francisco et al. ........... 702/100 |
| 6,360,579 B1 | * | 3/2002 | De Boom et al. ........... 73/1.35 |
| 7,028,528 B2 | * | 4/2006 | Antonijevic ................ 73/1.16 |
| 2004/0216509 A1 | * | 11/2004 | Antonijevic ................ 73/1.16 |

FOREIGN PATENT DOCUMENTS

| | | |
|---|---|---|
| DE | 2034290 A | 1/1972 |
| GB | 402954 A | 12/1933 |

OTHER PUBLICATIONS

Mark Lee, Dean Standiford & Aart Pruysen, ISO 17025 Accreditation for a Standing Start Finish (SSF) Primary Flow Stand and the Application To Using Coriolis Flowmeters as Reference Standards, Flomeko Conference 2003, May 11, 2003, Groningen, paper presented during conference and included in proceedings.

* cited by examiner

DEVICE FOR CONTINUOUS CALIBRATION OF A GAS MASS FLOW MEASUREMENT DEVICE

BACKGROUND OF THE INVENTION

1. Field of the Invention

The invention is related to the field of test systems, and in particular, to a gas test system for calibrating units under test.

2. Statement of the Problem

Flow meter designers often need to test new designs of flow meters for accuracy, quality, etc. Most design companies are able to do in-house testing of flow meters using liquids, as the test facilities for liquids can be set up without undue expense or time. Test facilities for gas are not as common in-house. Thus, the designers usually have to travel to a test facility and pay to use the test facility. This can be costly and time consuming. Plus, the designers would benefit from immediate feedback on design changes. As it sits now, the designers may have to wait weeks or months before they can test new designs and get test results on the new designs. The designers may benefit from a test facility for gas that is small enough and cost effective enough to set up in-house.

There are two main types of test facilities for gas. One type is a blow-down system. In a blow-down system, a compressor takes air at atmosphere and compresses the air into a tank. When the pressure in the tank is at a desired pressure for testing, the air is released from the tank and passes through a reference meter and a unit under test (UUT). The air is then vented back to atmosphere. The reference meter and the UUT measure the flow rate of the gas as it travels from the tank back to atmosphere. The measurements from the reference meter are used to calibrate the UUT. Unfortunately, blow-down systems have short runtimes, are costly and inefficient, and are extremely noisy. A blow-down system is illustrated in FIG. 1 and discussed further below.

Another type of test facility is a re-circulating gas loop. The Metering Research Facility operated by Southwest Research Institute® of San Antonio, Tex. uses a re-circulating gas loop. The Metering Research Facility includes the gas loop, a compressor, a chiller, sonic nozzles, and stations for units under test (UUT). The compressor circulates the gas around the gas loop at a desired flow rate. The compressor adds heat to the gas in the gas loop when it circulates the gas. The chiller cools the gas in the gas loop to a desired temperature. The UUT and one or more sonic nozzles measure the flow rate of the gas. The sonic nozzles are the reference meters for the UUT. The measurements from the UUT are compared to the measurements from the sonic nozzles to verify the accuracy of the meter under test or calibrate the UUT. Unfortunately, the Metering Research Facility is very large in size, is costly, and requires a lot of power to operate. Current Metering Research Facilities cannot be effectively assembled and operated in many companies due to size, cost, and power requirements. A Metering Research Facility is illustrated in FIG. 2 and discussed further below.

SUMMARY OF THE SOLUTION

The invention helps solve the above problems with a gas test system. The gas test system is comprised of a flow loop, a blower system, a temperature control system, a reference meter system, and a unit under test (UUT) system. The UUT system is configured to connect a unit under test (UUT) to the flow loop. With the flow loop pressurized with a gas, the blower system receives the gas under pressure at an inlet. From the pressurized gas at the inlet, the blower system generates a high flow rate of the gas out of an outlet to circulate the gas through the flow loop. The blower system generates a low pressure rise from the inlet to the outlet in generating the high flow rate. The temperature control system receives the flow of gas from the blower system and controls the temperature of the gas. The reference meter system measures a property of the gas circulating through the flow loop. If the UUT in the UUT system also measures a property of the gas circulating through the flow loop, then the measurements of the reference meter system can be compared to the measurements of the UUT to calibrate the UUT.

The gas test system advantageously provides a smaller, low cost, and efficient test system. The gas test system may be small enough and cost effective enough system to be built in-house. An in-house system allows designers of flow meters or other gas units to receive immediate feedback on design changes. This can save the designers time and money in developing new products. The gas test loop also uses much less electricity than prior system making it more cost effective to operate.

One aspect of the invention comprises a gas test system, comprising:

a flow loop configured to contain a gas;

a temperature control system coupled to said flow loop and configured to control the temperature of said gas;

a reference meter system coupled to said flow loop and configured to measure a property of said gas; and a unit under test system configured to connect a unit under test to said flow loop to allow said unit under test to measure a property of said gas;

said gas test system being characterized by:

a blower system having an inlet and an outlet and configured to receive said gas at said inlet, and generate a high flow rate of said gas out of said outlet to circulate said gas through said flow loop, wherein blower system generates a low pressure rise from said inlet to said outlet in generating said high flow rate.

Preferably, the gas test system is further characterized by:

a bypass loop coupled to an outlet of said temperature control system and said inlet of said blower system.

Preferably, the temperature control system is configured to cool said gas to substantially maintain said temperature of said gas at a constant level.

Preferably, the temperature control system further comprises:

a heat exchanger; and an evaporative cooling tower coupled to said heat exchanger.

Preferably, the blower system requires power less than 300 horsepower.

Preferably, the blower system is configured to generate said high flow rate of said gas at a flow rate between 300 and 1500 lbs/min.

Preferably, the blower system generates a pressure rise of less than about 40 PSI from said inlet to said outlet.

Preferably, the flow loop is pressurized between 25 and 700 PSI.

Preferably, the reference meter system comprises an array of reference sections connected in parallel.

Preferably, each of said reference sections comprises a flow meter.

Preferably, each of said reference sections comprises a volumetric flow meter and a mass flow meter.

Preferably, the mass flow meter comprises a Coriolis flow meter.

Preferably, each of said reference sections is for a particular flow rate range.

Preferably, the unit under test system comprises:
a unit under test configured to be tested for said gas; and
a coupler system configured to move axially to couple said unit under test to said flow loop.

Preferably, the unit under test section system comprises:
a vacuum configured to remove gases and moisture from the said unit under test section prior to flowing said gas through said unit under test.

Preferably, the gas test system further comprises:
a gas supply configured to initially pressurize said flow loop.

Preferably, the gas test system further comprises:
a gas dump configured to release said gas in said unit under test system and said flow loop.

Preferably, the gas test system further comprises:
a control system configured to control a flow of said gas through one of said reference sections.

Preferably, the control system is configured to compare measurements from said one of said reference sections and measurements from a unit under test in said unit under test system to calibrate said unit under test.

Another aspect of the invention comprises a method of operating a gas test system, wherein said gas test system comprises a flow loop configured to contain a gas, a temperature control system configured to control the temperature of said gas, a reference meter system configured to measure a property of said gas, and a unit under test system configured to connect a unit under test to said flow loop to allow said unit under test to measure a property of said gas, said method characterized by:
receiving said gas at an inlet of a blower system; and
generating a high flow rate of said gas out of an outlet of said blower system to circulate said gas through said flow loop, wherein said blower system generates a low pressure rise from said inlet to said outlet in generating said high flow rate.

Preferably, the method further comprises:
measuring a flow rate of said gas with said reference meter system;
measuring a flow rate of said gas with said unit under test; and
comparing said flow rate measured by said reference meter system and said flow rate measured by said unit under test to calibrate said unit under test.

Preferably, the method further comprises:
bypassing a portion of said gas from an outlet of said temperature control system and returning said portion of said gas to said inlet of said blower system.

Preferably, the method further comprises:
cooling said gas with said temperature control system to substantially maintain said temperature of said gas at a constant level.

Preferably, the reference meter system comprises an array of reference sections and the method further comprises:
controlling a flow of said gas through one of said reference sections.

DESCRIPTION OF THE DRAWINGS

The same reference number represents the same element on all drawings.

DETAILED DESCRIPTION OF THE INVENTION

Figure 1:
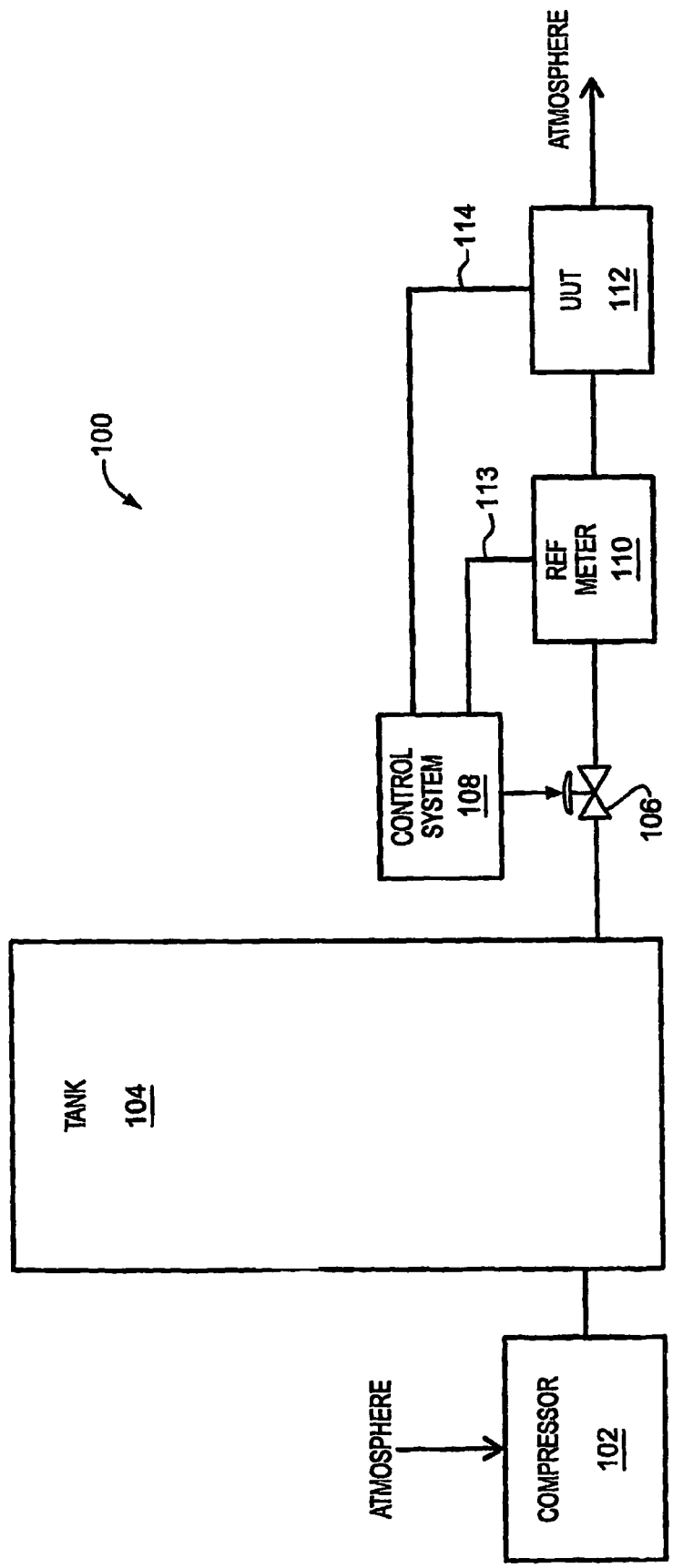
FIG. 1 illustrates a typical blow-down system in the prior art.
Figure 2:
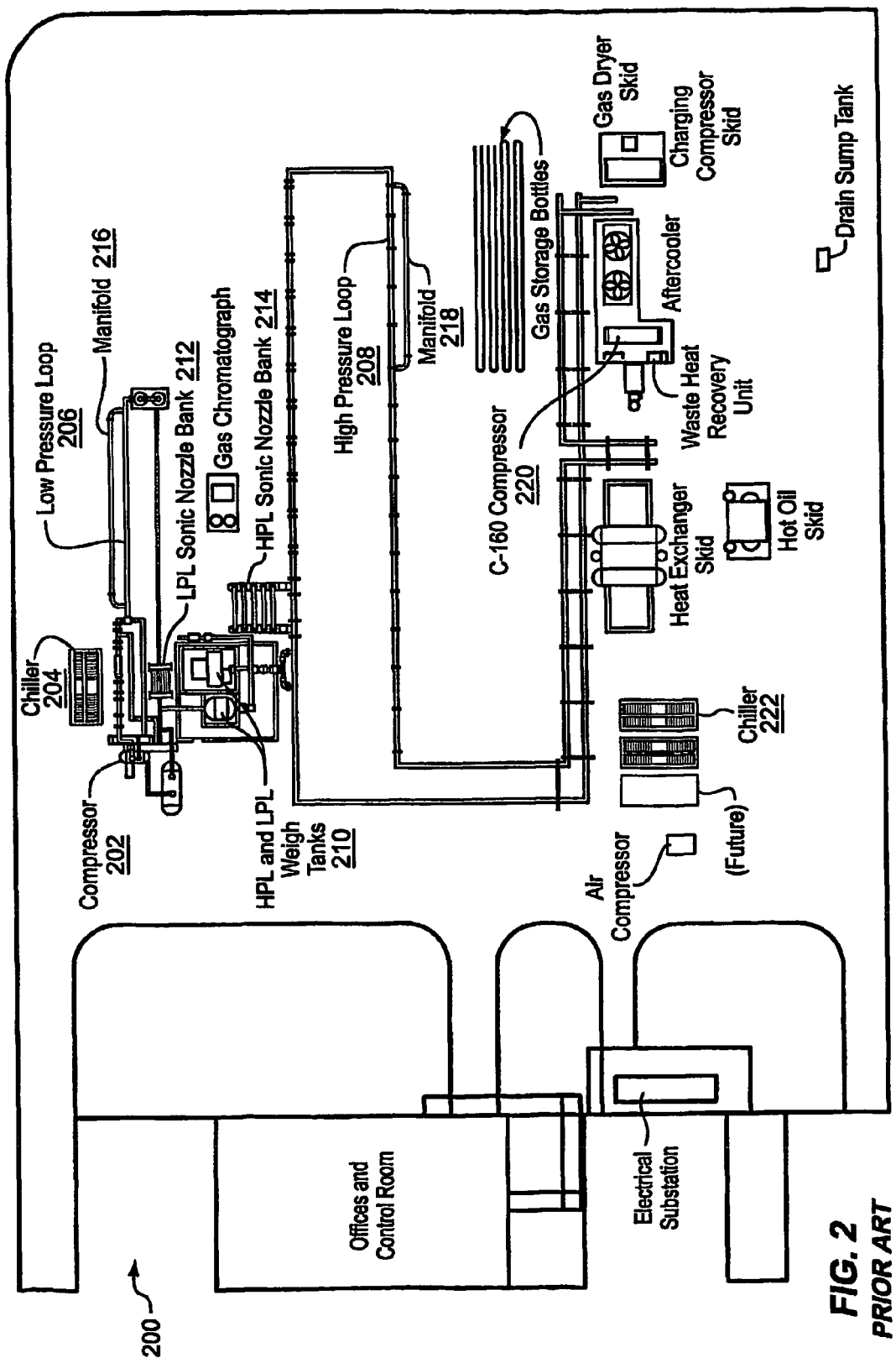
FIG. 2 illustrates a gas flow loop in the prior art.
Figure 3:
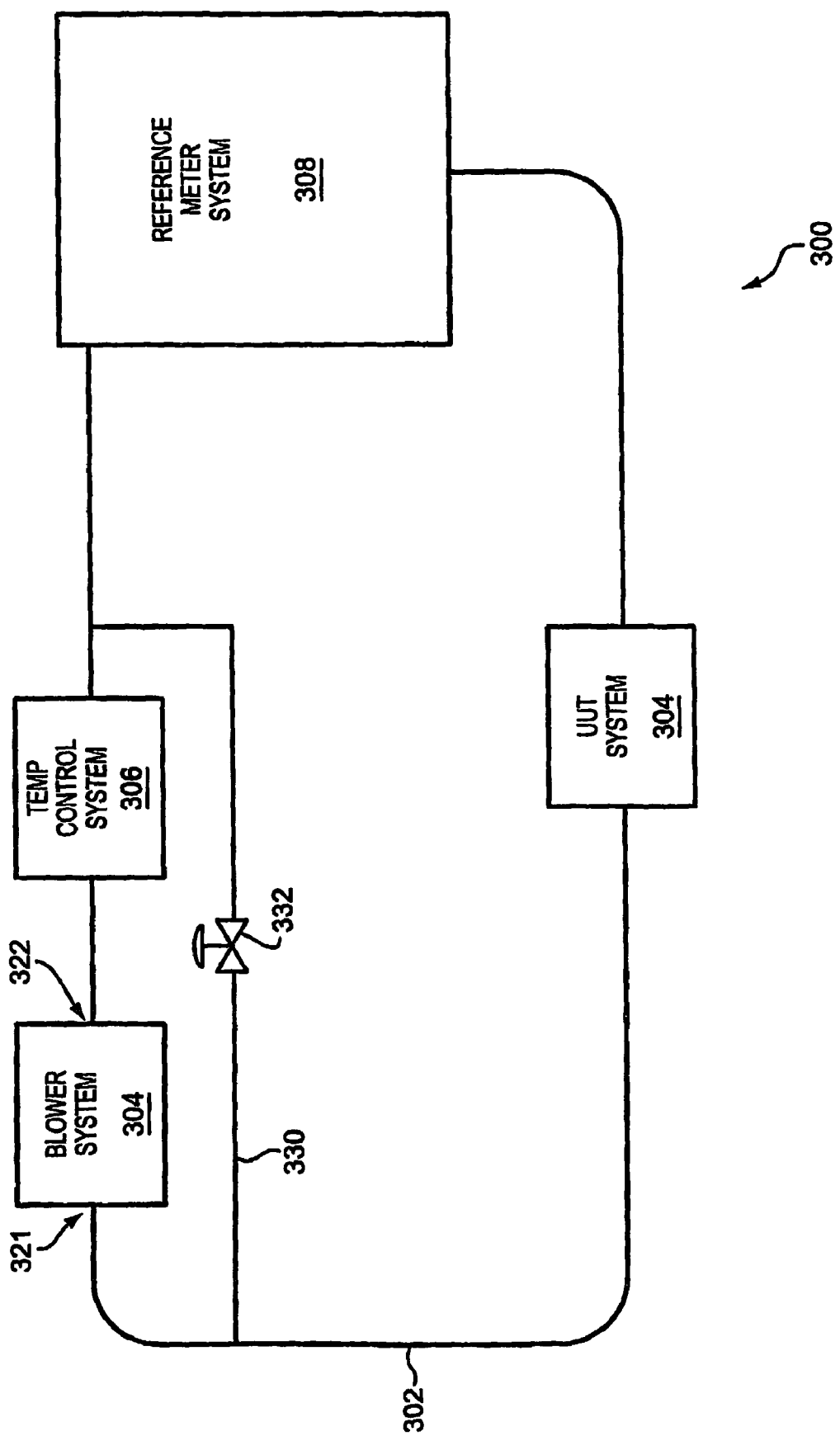
FIG. 3 illustrates a gas test system in an example of the invention.
Figure 4:
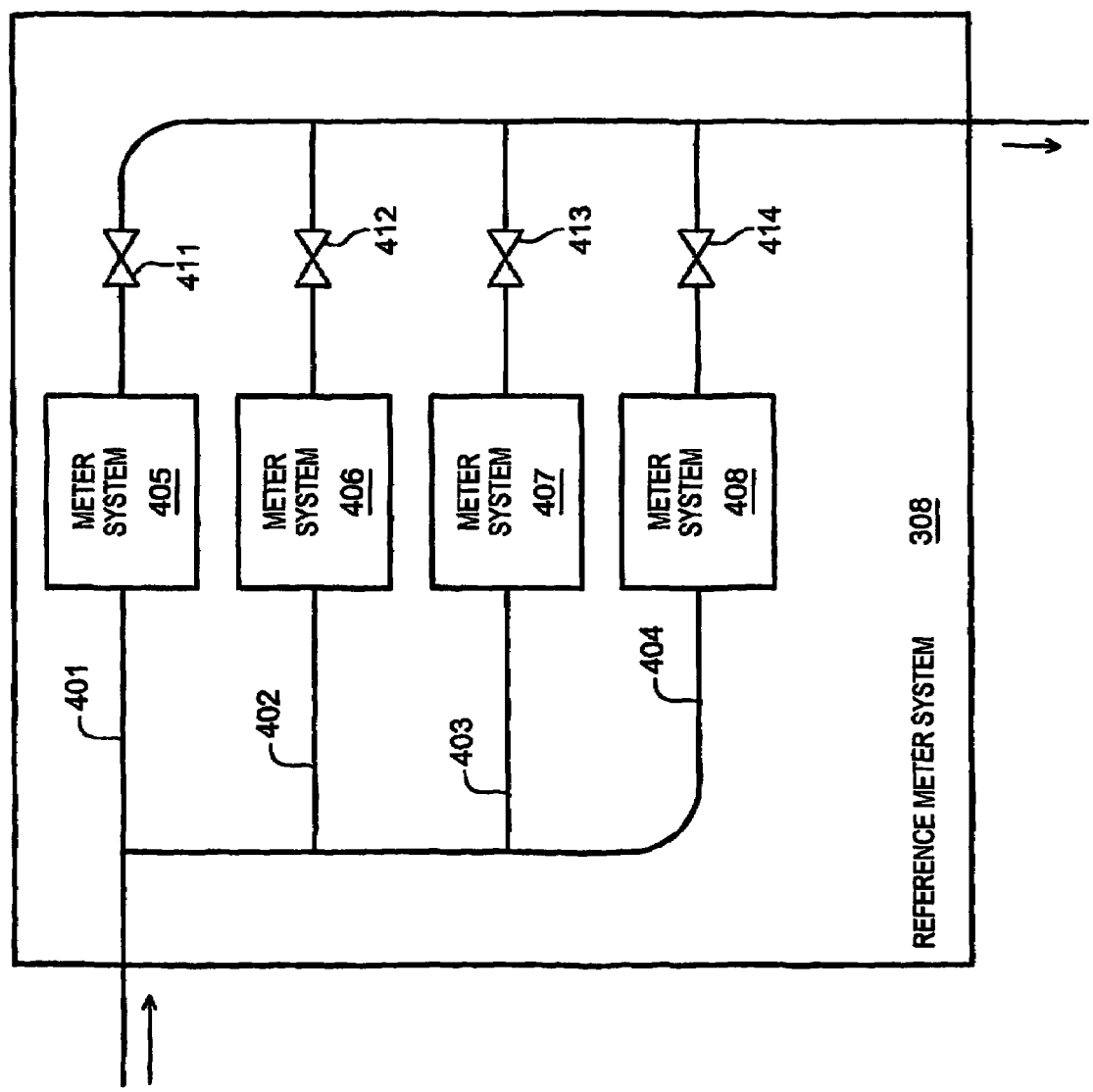
FIG. 4 illustrates an example of a reference meter system in an example of the invention.
Figure 5:
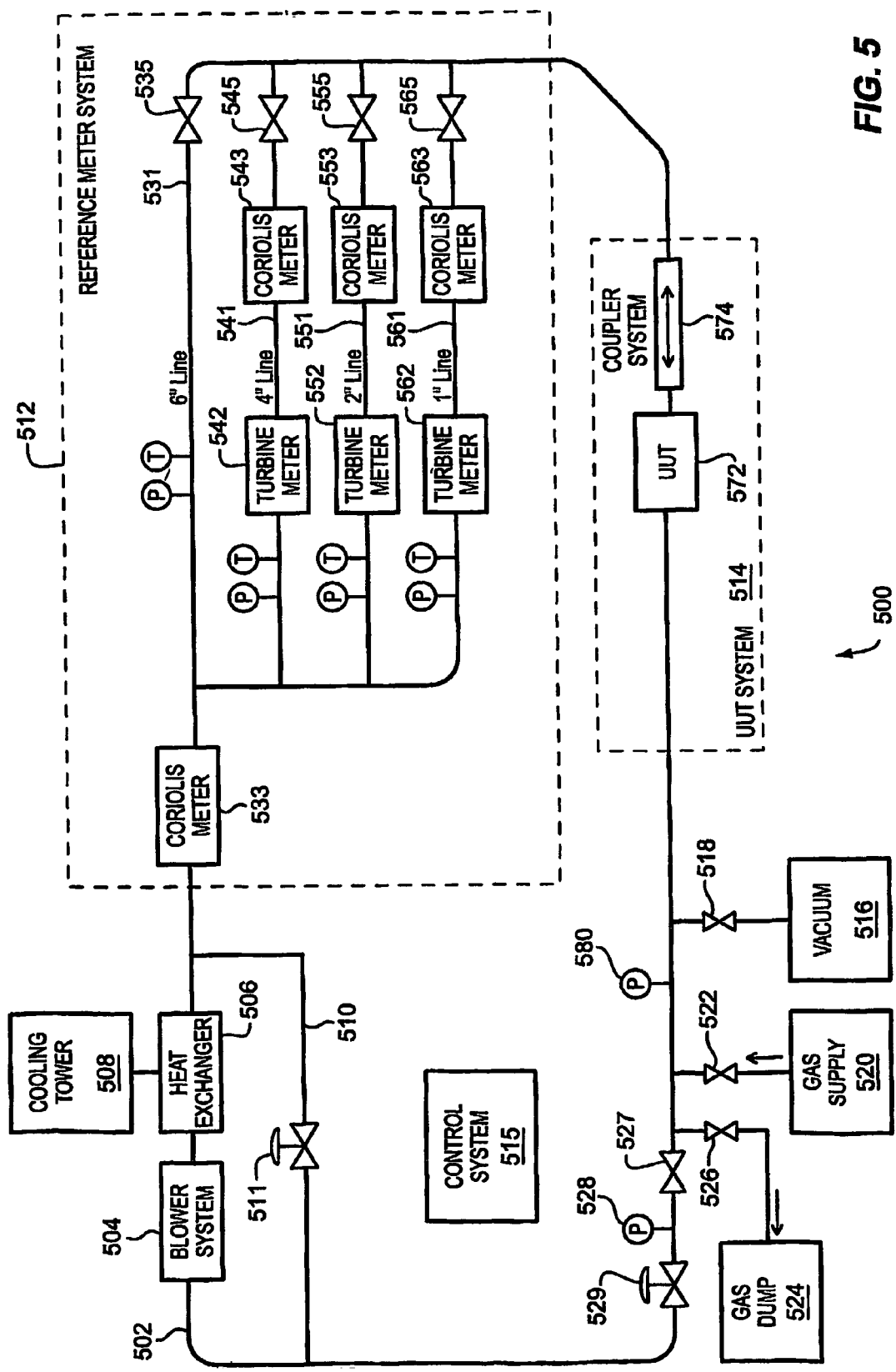
FIG. 5 illustrates another example of a gas test system in an example of the invention.

FIGS. 1-2 illustrate prior art systems to help understand the invention. FIGS. 3-5 and the following description depict specific examples of the invention to teach those skilled in the art how to make and use the best mode of the invention. For the purpose of teaching inventive principles, some conventional aspects of the invention have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Prior Art Blow-Down System—FIG. 1

FIG. 1 illustrates a typical blow-down system 100 in the prior art. Blow-down system 100 is comprised of a compressor 102, a tank 104, a pressure-regulating valve 106, a control system 108, a reference meter 110, and a unit under test (UUT) 112. Compressor 102 is coupled to tank 104. Tank 104 is coupled to control valve 106. Valve 106 is coupled to control system 108 and reference meter 110. Reference meter 110 is coupled to UUT 112. Control system 108 is coupled to reference meter 110 and UUT 112 via links 113 and 114, respectively.

In operation, compressor 102 takes air at atmosphere and compresses the air into tank 104 to a pressure much higher than atmosphere. For some tests, compressor 102 pumps the pressure in tank 104 up to 1000 PSI. When the pressure in tank 104 is high enough for testing purposes, valve 106 releases the air from tank 104. Control system 108 adjusts valve 106 to control the pressure and flow rate of the air being released from tank 104. The air travels through reference meter 110 and UUT 112 and is vented back to atmosphere.

As the air travels through reference meter 110 and UUT 112, control system 108 or another system reads flow rate measurements from reference meter 110 and UUT 112. Control system 108 compares the flow rate measurements from reference meter 110 to the flow rate measurements of UUT 112 to verify the accuracy of UUT 112 or calibrate UUT 112.

There are many problems with blow-down systems. First, blow-down systems have short run times. Tests end when the pressure in tank 104 drops enough that the pressure cannot provide the required flow rate for the test. This can be relatively fast depending on the size of tank 104 and the flow rate used for the test. Secondly, blow-down systems are costly and inefficient. Compressor 102 and tank 104 have to be sufficiently large to provide adequate testing times and flow rates. There is a trade-off between cost and run time for the blow-down systems. Compressor 102 also requires a lot of horsepower to fill tank 104, sometimes well over 1350 hp. For example, the work associated with pumping air to 500

PSI from ambient is 172,000 ft*lbf/lbm. The horsepower used to fill tank 104 is essentially wasted when the air is vented to atmosphere. Compressor 102 also generates heat that needs to be controlled. For example, pumping air from ambient to 500 PSI results in a 1500° Fahrenheit temperature rise with a compressor efficiency of 60%, assuming a simple, ideal thermodynamic model. Lastly, venting the pressurized air to atmosphere is extremely noisy. The noise can resonate back into reference meter 110 and UUT 112 negatively affecting the quality of the test. The noise can also be dangerous to the hearing of the testers.

Prior Art Metering Research Facility—FIG. 2

FIG. 2 illustrates a metering research facility 200 in the prior art Metering research facility 200 illustrates the Metering Research Facility operated by Southwest Research Institute® of San Antonio, Tex. Metering research facility 200 includes a low pressure loop 206 and a high pressure loop 208. Low pressure loop 206 includes a compressor 202, a chiller 204, weigh tanks 210, a sonic nozzle bank 212, and a manifold 216. High pressure loop 208 includes a compressor 220, a chiller 222, a sonic nozzle bank 214, and a manifold 218. Manifolds 216 and 218 connect a unit under test (UUT) in metering research facility 200 for testing. Metering research facility 200 includes other components that are not discussed for the sake of brevity.

Low pressure loop 206 and high pressure loop 208 are both re-circulating flow loops. To test a meter in high pressure loop 208, the UUT is bolted into manifold 218 of loop 208. Loop 208 is initially pressurized with a gas. Loop 208 may be pressurized up to 1000 PSI. With loop 208 pressurized, compressor 220 circulates the gas in loop 208 at a desired flow rate. Compressor 220 may circulate the gas at a flow rate of 3000 lbs/min (at 1000 PSI) in loop 208. To circulate the gas at these high pressures, compressor 220 is very large. As with all compressors, compressor 220 generates a lot of heat in circulating the gas. Chiller 222 cools the gas to a desired temperature for the test. As compressor 220 generates a lot of heat, chiller 222 has to be sufficiently large to remove the heat from the gas.

The UUT and one or more sonic nozzles in sonic nozzle bank 214 measure the flow rate of the gas circulating in loop 208. The sonic nozzles are the reference meters for the UUT. A controller or operator then compares the measurements from the sonic nozzles to the measurements of the UUT to verify the accuracy of the UUT or calibrate the UUT.

Some problems with metering research facility 200 are its size, its cost, and the amount of power it requires to operate. Metering research facility 200 needs a lot space to assemble and operate and can't be easily set up inside a building. The Metering Research Facility in San Antonio is constructed outside and takes up space equivalent to many football fields.

Because of the high pressures and flow rates used by metering research facility 200, compressor 220 is very large. Compressor 220 may be as large as 1200 hp. Compressor 220 needs to be large because of the high pressure received at the inlet by compressor 220. A compressor typically works with a low inlet pressure, commonly around atmosphere. However, loop 208 is under pressure (up to 1000 PSI) and provides a much higher pressure to the inlet of compressor 220 than atmospheric pressure. The higher pressure on the inlet can damage a typical compressor, unless the compressor is very large. A very large compressor (around 1000 hp) may be able to handle the higher pressures at the inlet.

Unfortunately, large compressors are inefficient require a lot of power, and generate a lot of heat. Thus, compressor 220 injects a lot of heat into loop 208 when circulating the gas through loop 208. As stated above, chiller 222 cools the temperature of the gas raised by compressor 220. However, if compressor 220 injects a lot of heat in loop 208, then chiller 222 has to be sufficiently large to remove the heat from loop 208. For instance, a 1000 hp compressor may necessitate a chiller using 1000 hp of electricity to compensate for the heat generated by the compressor. The combination of compressor 220 and chiller 222 unfortunately require a lot of power when metering research facility 200 is operating.

Because of the problems described above, metering research facility 200 may not be feasible, economically or otherwise, for many companies due to its size, cost, and power requirements. Thus, designers may have to perform off-site testing which can be time consuming and expensive.

EXAMPLE #1—FIGS. 3-4

FIG. 3 illustrates a gas test system 300 in an example of the invention. Gas test system 300 is comprised of a flow loop 302, a blower system 304, a temperature control system 306, a reference meter system 308, and a unit under test system 310. Flow loop 302 comprises a closed flow loop. Blower system 304, temperature control system 306, reference meter system 308, and UUT system 310 are coupled to flow loop 302 so as to keep flow loop 302 as a closed loop.

The following definitions may help to understand the invention. A blower system comprises any system, device, or component having an inlet and an outlet and configured to receive a gas under pressure and generate a high flow rate of the gas out of the outlet. The blower system generates a low pressure rise from inlet to outlet in generating the high flow rate. An example of a blower system is a compressor manufactured by Sundyne Corporation of Arvada, Colo. The blower system in this example of the invention is not a typical compressor that generates a higher pressure rise from inlet to outlet and a low volume flow. The blower system is also not a typical compressor in that it can handle gas under pressure at its inlet.

A flow loop comprises any tubing, piping, or enclosed structure configured to contain a gas. A temperature control system comprises any system, device, or component configured to control the temperature of a gas circulating through a flow loop. The temperature control system may work to keep the temperature at a substantially constant level. An example of a temperature control system comprises a heat exchanger or a heat exchanger coupled to an evaporative cooling tower. A reference meter system comprises any system, devices, or components configured to measure a property of a gas circulating through a gas loop. A unit under test system comprises any system, device, or component configured to connect a unit under test to the flow loop. A high flow rate comprises a flow of gas at a rate of at least 300 lbs/min. A low pressure rise comprises a rise of pressure under about 50 PSI. Calibrate refers to checking the accuracy of a unit under test or adjusting a unit under test to increase the accuracy. For instance, calibration of a Coriolis flow meter may include adjusting a flow calibration factor to increase the accuracy of the Coriolis flow meter.

In operation, a unit under test (UUT) is connected into flow loop 302 via UUT system 310. Examples of a UUT comprise a flow meter, a Coriolis flow meter, or some other gas unit. Flow loop 302 is then initially pressurized with a gas. The gas may be air, natural gas, helium, or any other gas. With flow loop 302 pressurized and the testing to begin, blower system 304 receives the gas under pressure at inlet 321. From the pressurized gas at inlet 321, blower system 304 generates a high flow rate of the gas out of outlet 322 to circulate the gas through flow loop 302. Blower system 304 generates a low pressure rise from inlet 321 to outlet 322 in generating the high flow rate. Temperature control system 306 receives the flow of gas from blower system 304 and controls the temperature of the gas. Controlling the temperature may mean cooling the gas in flow loop 302 to a desired temperature for the test. Reference meter system 308 measures properties of the gas circulating through flow loop 302. The UUT in UUT system 310 also measures properties of the gas circulating through flow loop 302. The measurements of reference meter system 308 can then be compared to the measurements of the UUT to calibrate the UUT. Based on this disclosure, those skilled in the art would be able to modify existing gas test systems to make gas test system 300.

In one embodiment of the invention, gas test system 300 also includes a bypass loop 330. Bypass loop 330 includes a control valve 332 configured to control the flow of gas through bypass loop 330. Bypass loop 330 is configured to take a portion of the gas from an outlet of temperature control system 306 and return it to inlet 321 of blower system 304. Control valve 332 controls the amount of gas returned to inlet 321 of blower system 304.

FIG. 4 illustrates an example of a reference meter system 308 in an example of the invention. Reference meter system 308 is comprised of an array of reference sections 401-404 connected in parallel. Reference sections 401-404 include meter systems 405-408, respectively. Meter systems 405-408 may include one or more mass flow meters, one or more volumetric flow meters, one or more Coriolis flow meters, one or more turbine meters, or some other gas measurement unit. Each reference section 401-404 also includes a block valve 411-414. There may be more or less reference sections in the array depending on particular implementations. Each meter system 405-408 is configured for a particular accuracy for measuring a particular property of the gas. For instance, meter system 405 may be the most accurate at high flow rates. Meter system 408 may be the most accurate at low flow rates. Meter system 406 and meter system 407 may be more accurate for flow rates between the high and low flow rates. Block valves 411-414 determine which of the meter systems 405-408 are used as a reference.

EXAMPLE #2—FIG. 5

FIG. 5 illustrates a gas test system 500 in an example of the invention. Gas test system 500 is configured to provide ranges of 500 to 1500 lbs/min at 100 to 700 PSI. Gas test system 500 is comprised of a flow loop 502, a blower system 504, a heat exchanger 506, an evaporative cooling tower 508, a bypass loop 510, a reference meter system 512, a unit under test (UUT) system 514, a control system 515, a block valve 527, a pressure gauge 528, and a control valve 529. Gas test system 500 also includes a vacuum 516 coupled to flow loop 502 through a block valve 518. Gas test system 500 also includes a gas supply 520 coupled to flow loop 502 through a block valve 522. Gas test system 500 also includes a gas dump 524 coupled to flow loop 502 through a block valve 526. Gas test system 500 may include other components not shown for the sake of brevity.

Bypass loop 510 includes a control valve 511 configured to control the flow of gas through bypass loop 510. Bypass loop 510 is configured to take gas from an outlet of heat exchanger 506 and return it to an inlet of blower system 504. Bypass loop 510 helps gas test system 500 run effectively at low flow rates. Control valve 511 controls the amount of gas returned to the inlet of blower system 504. Bypass loop 510 is a two-inch line.

Reference meter system 512 comprises a plurality of reference sections 531, 541, 551, and 561. Section 531 comprises a six-inch line, a Coriolis flow meter 533, and a block valve 535. Coriolis flow meter 533 may be a CMF 400 manufactured by Micro Motion Inc. of Boulder, Colo. Block valve 535, and the other block valves used in this example, are very low leakage, full bore ball valves. Section 541 comprises a four-inch line, a turbine meter 542, a Coriolis flow meter 543, and a block valve 545. Coriolis flow meter 543 may be a CMF 300 manufactured by Micro Motion Inc. Section 551 comprises a two-inch line, a turbine meter 552, a Coriolis flow meter 553, and a block valve 555. Coriolis flow meter 553 may be a CMF 200 manufactured by Micro Motion Inc. Section 561 comprises a one-inch line, a turbine meter 562, a Coriolis flow meter 563, and a block valve 565. Coriolis flow meter 563 may be a CMF 100 manufactured by Micro Motion Inc. Each section includes a temperature and pressure sensor. Some or all of the components in reference meter system 512 may communicate with control system 515. Reference meter system 512 may include more or less reference sections depending on particular implementations. Gas test system 500 may also include multiple reference meter systems 512 placed at different locations on flow loop 502. For instance, there may be a reference meter system 512 on either side of UUT system 514.

UUT system 514 is configured to connect a unit under test (UUT) 572 to flow loop 502. UUT system 514 includes one or more spool pieces for bolting UUT 572 to flow loop 502. UUT system 514 also includes a coupler system 574 that makes attaching UUT 572 easier. Coupler system 574 allows for axial adjustment to the spool pieces, maybe twenty inches or more. This results in more flexibility in the lengths of spool pieces used in UUT system 514. Coupler 574 is pressure balanced so there is no axial load due to pressure.

In operation, UUT 572 is connected to flow loop 502 via UUT system 514. To connect UUT 572, one or more spool pieces are bolted onto flow loop 502. Coupler system 574 is used with the spool pieces to connect UUT 572 to flow loop 502. With UUT 572 connected, control system 515 opens valve 518 and vacuum 516 vacuums gases and moisture out of UUT system 514, or other parts of flow loop 502. Control system 515 then closes valve 518. Control system 515 then opens valve 522 and gas supply 520 initially pressurizes flow loop 502 with a gas. The gas could be air, natural gas, helium, etc. Gas supply 520 pressurizes flow loop 502 between 25 to 700 PSI, or maybe higher. Gas supply 520 may include a compressor, bottled gas, or another supply.

With flow loop 502 pressurized to a desired nominal pressure, testing may begin Blower system 504 circulates the pressurized gas through flow loop 502 at high flow rates. Blower system 504 may circulate the gas at a flow rate between 500 and 1500 lbs/min. As stated above, blower system 504 is not a typical compressor. A typical compressor generates a high pressure rise (100 PSI or more) and a low flow rate. Blower system 504 generates a high flow rate and a low pressure rise. Plus, typical compressors cannot handle high pressure at the inlet. The high pressure at the inlet may cause a large trust load on the impellers, and the bearings in a typical compressor cannot handle trust loads. An example of blower system 504 is a compressor manufactured by Sundyne Corporation of Arvada, Colo. The Sundyne compressor is designed with thrust bearings that can handle inlet pressures approaching 1000 PSI.

Blower system 504 only needs to provide a pressure rise equal to the pressure loss throughout gas test system 500. The pressure loss in gas test system is about 10 to 30 PSI. Therefore, blower system 504 only generates a pressure rise of less than about 50 PSI to compensate for the 10 to 30 PSI pressure loss. Blower system 504 may generate a pressure rise of less than 45 PSI, 40 PSI, 35 PSI, 30 PSI, 25 PSI, 20 PSI, 15 PSI, or 10 PSI depending on particular implementations. Blower system 504 does not require a lot of horsepower because only a small pressure rise is needed. Blower system 504 may require less than 300 hp, 275 hp, 250 hp, 225 hp, 200 hp, 175 hp, or 150 hp, depending on particular implementations. In this example, blower system 504 requires about 150 hp.

In circulating the gas, blower system 504 adds heat to the gas. Heat exchanger 506 and cooling tower 508 help to cool the gas and maintain a constant temperature in flow loop 502. Heat exchanger 506 is a shell-and-tube heat exchanger having a plurality of tubes. The gas from flow loop 502 passes through the tubes as a glycol/water mixture passes over the tubes to transfer the heat from the gas to the glycol/water mixture. Other mixtures or fluids may be used as the heat transfer fluid. A pump (not shown) pumps the glycol/water mixture through heat exchanger 506 and into cooling tower 508. Cooling tower 508 includes a closed loop through which the heated glycol/water mixture is pumped. Cooling tower 508 sprays water over the closed loop and a fan blows air up through the closed loop to cool the glycol/water mixture.

After the gas passes through heat exchanger 506, some gas may be diverted through bypass loop 510. The amount of gas diverted through bypass loop 510 is controlled by control system 515 and valve 511. Bypass loop 510 takes the gas from the outlet of heat exchanger 506 and returns it to the inlet of blower system 504. Bypass loop 510 helps to avoid thermal runaway with blower system 504 because bypass loop 510 returns cooled gas from heat exchanger 506 to blower system 504 instead of heated gas. Bypass loop 510 is also used at low flow rates of the gas to prevent blower system 504 from surging or being dead-headed. Surging generally happens at high head, low flow rate conditions. Bypass loop 510 allows blower system 504 to see a higher flow rate while the flow rate in flow loop 502 is lower. Thus, to achieve lower flow rates in flow loop 502, blower system 504 can be set to higher flow rate in a comfortable operating range. Control system 515 can raise and lower the flow rate through flow loop 502 by controlling the amount of gas being diverted through bypass loop 510. When the flow rates need to be increased, blower system 504 can be turned up and bypass loop 510 may be shut off.

The gas then passes into reference meter system 512. In reference meter system 512, the gas passes through Coriolis flow meter 533 and section 531. Coriolis flow meter 533 measures a flow rate and/or other properties of the gas, and provides the measurements to control system 515. Coriolis flow meter 533 is the primary reference meter for higher flow rates.

The gas may also pass through the other sections of reference meter system 512. As stated before, each section includes both a turbine meter and a Coriolis flow meter. Control system 515 is configured to determine which section(s) the gas passes through by opening and, closing the block valves in each section. Control system 515 selects the section or sections that provide maximum reference meter accuracy. The turbine meters and Coriolis flow meters in each section are sized appropriately for the desired pressures and flow rates. Using multiple meters in each section maximizes the accuracy and traceability of reference meter system 512.

Control system 515 puts one section in flow loop 502 by adjusting the block valves. The turbine meter and Coriolis flow meter in the selected section measures a flow rate and/or other properties of the gas, and provides the measurements to control system 515. The gas then passes into UUT system 514. UUT 572 measures a flow rate and/or other properties of the gas, and provides the measurements to control system 515. The gas then circulates around flow loop 502 and back to blower system 504. Control valve 529 controls the operating pressure in flow loop 502 so that flow loop 502 is at a desired pressure.

Control system 515 receives the measurements from reference meter system 512 and UUT 572. Control system 515 compares the measurements from reference meter system 512 to the measurements from UUT 572 to calibrate UUT 572. There may be different methods of using the measurements from the turbine meter and the Coriolis flow meter in each section.

For instance, assume that section 541 is put in flow loop 502 by control system 515. Turbine meter 542 measures a volumetric flow rate of the gas, and the pressure sensor and temperature sensor take their respective measurements. Control system 515 receives the measurements from turbine meter 542, the pressure sensor, and the temperature sensor. From the measurements, control system 515 calculates a mass flow rate of the gas. Turbine meter 542 in this example acts as a quality check meter. Coriolis flow meter 543 measures a mass flow rate of the gas and provides the mass flow measurement to control system 515. Coriolis flow meter 543 acts as a transfer standard meter, which is the reference meter for UUT 572. Control system 515 compares the mass flow rate measured by Coriolis flow meter 543 to the mass flow rate calculated from the measurements of turbine meter 542. Based on the comparison, control system 515 verifies that Coriolis flow meter 543 is accurate enough to act as a reference meter for UUT 572. UUT 572 then measures a mass flow rate of the gas and provides the mass flow measurement to control system 515. Control system 515 compares the mass flow rate measured by Coriolis flow meter 543 to the mass flow rate measured by UUT 572 to calibrate UUT 572.

In other embodiments, Coriolis flow meter 543 may act as a quality check meter and turbine meter 542 may act as the reference meter. Coriolis flow meter 543 and turbine meter 542 may both act as reference meters. In any event, using a mass flow meter and a volumetric flow meter in the same section can be advantageous. Each meter is susceptible to error, but conditions that affect a mass flow meter may not affect a volumetric flow meter and vice-versa. Thus, this combination can provide better accuracies.

There may be many ways to calibrate UUT 572 using reference meters. One example is illustrated in U.S. Pat. No. 6,360,579, which is incorporated herein by reference in its entirety.

Control system 515 may be comprised of instructions that are stored on a storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media When testing is done on UUT 572, control system 515 closes the appropriate block valves 527, 535, 545, 555, and 565 to isolate UUT system 514 from the rest of flow loop 502. UUT system 514 can then be de-pressurized while the rest of flow loop 502 maintains its operating pressure. With UUT system 514 isolated, control system 515 opens block valve 526 to release the gas in UUT system 514 to gas dump 524. Gas dump 524 may be a pipe venting the gas to atmosphere. Pressure gauge 580 indicates when the gas is been dumped out of UUT system 514. Control system 515 then closes block valve 526.

Control system 515 may include various safety features and alarms so that UUT system 514 will not be opened under pressure. Control system 515 may also include various safety features and alarms to ensure that gas test system 500 is operating properly. For instance, if the pressure is too high in flow loop 502, if the flow rate is too high in flow loop 502, if the temperature of the gas is too high, then control system 515 may sound an alarm and/or shut gas test system 500 down.

UUT 572 may then be removed from UUT system 514. Another UUT can then be connected into UUT system 514. With the new UUT connected, control system 515 opens valve 518 and vacuum 516 vacuums gases and moisture out of UUT system 514. When the new UUT is installed, gases and moisture in the atmosphere around gas test system 500 enter UUT system 514. Vacuum 514 vacuums out the gases and moisture, and control system 515 closes valve 518. Control system 515 then opens valve 522 and gas supply 520 pressurizes UUT system 514 with the gas used for the test. With UUT system 514 pressurized, control system 515 opens one or more of block valves 527, 535, 545, 555, and 565 and testing begins on the new UUT.

Gas test system 500 as described above advantageously provides a low cost, efficient gas test loop. Gas test system 500 is capable of flowing 400 lbs/min at 100 PSI and 1500 lbs/min at 700 PSI (maximum mass flow rate is dependent on pressure). These flow rates and pressures allow for testing and calibration of flow meters at normal operating flow rates.

Gas test system 500 provides many advantages over a blow-down system (see FIG. 1). First, gas test system 500 can run for hours if need, wherein blow-down systems have very short run-times. Second, blower system 504 in gas test system 500 can also be much smaller than a compressor of a blow-down system because blower system 504 does not need to build a lot of pressure. Third, gas test system 500 does not need a large tank to hold the pressurized gas. Fourth, gas test system 500 does not need to vent the gas to atmosphere, consequently avoiding the extreme noise problems associated with blow-down systems.

Gas test system 500 provides many advantages over the metering research facility 200 shown in FIG. 2. First, gas test system 500 is smaller than metering research facility 200. Gas test system 500 can be made small enough to be placed in a building, or even a corner of a building, where metering research facility 200 is very large. Second, gas test system 500 is less expensive than metering research facility 200. The components of metering research facility 200, such as compressor 202, chiller 204, and weigh tanks 210, are very large and very expensive. It may not be economically feasible for a flow meter design company to build a facility like metering research facility 200. On the other hand, gas test system 500 uses smaller, less expensive components making gas test system 500 feasible for many companies. For instance, metering research facility 200 uses a very large compressor (1200 hp) where gas test system 500 uses a blower system that is much smaller (150 hp). The selection of blower system is important in making gas test system 500 as small, efficient, and cost effective as it is. Third, gas test system 500 requires less horsepower to operate than metering research facility 200. As stated before, metering research facility 200 uses a very large compressor that requires about 1200 hp. The very large compressor adds a lot of heat to the gas being circulated. Therefore, metering research facility 200 also needs a very large cooling system to take the heat from the compressor out of the gas. The very large compressor and cooling system need a lot of electricity to operate. On the other hand, blower system 504 in gas test system 500 is relatively small and only uses about 150 hp. Therefore, gas test system 500 only needs a small heat exchanger 506 and cooling tower 508 to take the heat out of the gas. Gas test system 500 requires much less electricity than metering research facility 200.

Gas test system 500 advantageously provides a small enough and cost effective enough system that can be built in-house. Designers can then receive immediate feedback on design changes, as they can test flow meter designs in-house. This can save the designers time and money in developing new products.

What is claimed is:

1. A gas test system (300), comprising:
    a flow loop (302) configured to contain a pressurized gas;
    a temperature control system (306) coupled to said flow loop and configured to contol the temperature of said pressurized gas;
    a reference meter system (308) coupled to said flow loop and configured to measure a property of said pressurized gas; and
    a unit under test system (310) configured to connect a unit under test to said flow loop to allow said unit under test to measure a property of said pressurized gas;
    said gas test system being characterized by:
        a blower system (304) having an inlet (321) and an outlet (322) and configured to receive said pressurized gas at said inlet, and generate a high flow rate of said pressurized gas out of said outlet to circulate said pressurized gas through said flow loop, wherein the blower system generates a low pressure rise from said inlet to said outlet in generating said high flow rate.

2. The gas test system (300) of claim 1, further characterized by:
    a bypass loop (330) coupled to an outlet of said temperature control system (306) and said inlet (321) of said blower system (304).

3. The gas test system (300) of claim 1, wherein said temperature control system (306) is configured to cool said pressurized gas to substantially maintain said temperature of said pressurized gas at a constant level.

4. The gas test system (300, 500) of claim 3, further characterized by said temperature control system (306) comprising:
    a heat exchanger (506); and
    an evaporative cooling tower (508) coupled to said heat exchanger.

5. The gas test system (300) of claim 1, wherein said blower system (304) requires power less than 300 horsepower.

6. The gas test system (300) of claim 1, wherein said blower system (304) is configured to generate said high flow rate of said pressurized gas at a flow rate between 300 and 1500 lbs/min.

7. The gas test system (300) of claim 1, wherein said blower system (304) generates a pressure rise of less than about 40 PSI from said inlet (321) to said outlet (322).

8. The gas test system (300, 500) of claim 1, wherein said flow loop (302, 502) is pressurized between 25 and 700 PSI.

9. The gas test system (300, 500) of claim 1, further characterized by said reference meter system (308, 512) comprising an array of reference sections (401-404, 531, 541, 551, 561) connected in parallel.

10. The gas test system (300, 500) of claim 9, wherein each of said reference sections (401-404, 531, 541, 551, 561) comprises a flow meter.

11. The gas test system (300, 500) of claim 10, wherein each of said reference sections (531, 541, 551, 561) comprises a volumetric flow meter and a mass flow meter.

12. The gas test system (300, 500) of claim 11, wherein said mass flow meter comprises a Coriolis flow meter (533, 543, 553, 563).

13. The gas test system (300, 500) of claim 8, wherein each of said reference sections (401-404, 531, 541, 551, 561) is for a particular flow rate range.

14. The gas test system (300, 500) of claim 1, further characterized by said unit under test system (310, 514) comprising:
a unit under test (572) configured to be tested for said pressurized gas; and
a coupler system (574) configured to move axially to couple said unit under test to said flow loop (302, 502).

15. The gas test system (300, 500) of claim 14, wherein said unit under test section system (310, 514) comprises:
a vacuum (516) configured to remove gases and moisture from said unit under test system prior to flowing said pressurized gas through said unit under test (572).

16. The gas test system (300, 500) of claim 1, further characterized by:
a gas supply (520) configured to initially pressurize said flow loop (502).

17. The gas test system (300, 500) of claim 1, further characterized by:
a gas dump (524) configured to release said pressurized gas in said unit under test. system (514) and said flow loop (502).

18. The gas test system (300, 500) of claim 9, further characterized by:
a control system (515) configured to control a flow of said pressurized gas through one of said reference sections (401-404, 531, 541, 551, 561).

19. The gas test system (300, 500) of claim 18, wherein said control system (515) is configured to compare measurements from said one of said reference sections (401-404, 531, 541, 551, 561) and measurements fromaunit under test (572) in said unit under test system (514) to calibrate said unit under test.

20. A method of operating a gas test system (300), wherein said gas test system comprises a flow hoop (302) configured to contain a pressurized gas, a temperature control system (306) configured to control the temperature of said pressurized gas, a reference meter system (308) configured to measure a property of said pressurized gas, and a unit under test system (310) configured to connect a unit under test to said flow loop to allow said unit under test to measure a property of said pressurized gas,
said method characterized by:
receiving said pressurized gas at an inlet (321) of a blower system (304); and
generating a high flow rate of said pressurized gas out of an outlet (322) of said blower system (304) to circulate said pressurized gas through said flow loop, wherein said blower system generates a low pressure rise from said inlet to said outlet in generating said high flow rate.

21. The method of claim 20, further comprising:
measuring a flow rate of said pressurized gas with said reference meter system (308);
measuring a flow rate of said pressurized gas with said unit under test; and comparing said flow rate measured by said reference meter system and said flow rate measured by said unit under test to calibrate said unit under test.

22. The method of claim 20, further comprising:
bypassing a portion of said pressurized gas from an outlet of said temperature control system (306) and returning said portion of said pressurized gas to said inlet (321) of said blower system (304).

23. The method of claim 20, further comprising:
cooling said pressurized gas with said temperature control system (306) to substantially maintain said temperature of said pressurized gas at a constant level.

24. The method of claim 20, wherein said reference meter system (308, 512) comprises an array of reference sections (401-404, 531, 541, 551, 561), and wherein the method further comprises:
controlling a flow of said pressurized gas though one of said reference sections.

* * * * *

UNITED STATES PATENT AND TRADEMARK OFFICE
CERTIFICATE OF CORRECTION

PATENT NO. : 7,343,775 B2  Page 1 of 1
APPLICATION NO. : 10/557077
DATED : March 18, 2008
INVENTOR(S) : Timothy J. Cunningham et al.

It is certified that error appears in the above-identified patent and that said Letters Patent is hereby corrected as shown below:

Column 8, lines 64 and 65, each occurrence of the word "trust" should be changed to -- thrust --.

Column 12, line 33, replace "contol" with -- control --.

Column 13, line 45, after "test" delete ".".

Column 14, line 4, replace "fromaunit" with -- from a unit --; line 8, replace "hoop" with -- loop --; line 48, replace "though" with -- through --.

Signed and Sealed this

Twenty-second Day of July, 2008

JON W. DUDAS
*Director of the United States Patent and Trademark Office*